United States Patent
Kusumi

(10) Patent No.: US 7,249,237 B2
(45) Date of Patent: Jul. 24, 2007

(54) CONTROL METHOD FOR DATA TRANSFER CONTROL UNIT

(75) Inventor: Takeo Kusumi, Kanagawa (JP)

(73) Assignee: NEC Electronics Corporation (JP)

( * ) Notice: Subject to any disclaimer, the term of this patent is extended or adjusted under 35 U.S.C. 154(b) by 363 days.

(21) Appl. No.: 10/386,779

(22) Filed: Mar. 12, 2003

(65) Prior Publication Data

US 2003/0182506 A1    Sep. 25, 2003

(30) Foreign Application Priority Data

Mar. 19, 2002    (JP) ............................. 2002-076147

(51) Int. Cl.
*G06F 12/06* (2006.01)

(52) U.S. Cl. .................. 711/170; 711/154; 710/56; 710/57

(58) Field of Classification Search ............. 711/154, 711/152, 166, 170; 710/56, 57, 59
See application file for complete search history.

(56) References Cited

U.S. PATENT DOCUMENTS

| 5,623,607 A * | 4/1997 | Kodama et al. ............ 710/29 |
| 6,567,953 B1 * | 5/2003 | Pomerantz ................ 714/805 |
| 6,633,933 B1 * | 10/2003 | Smith et al. ................ 710/74 |
| 2002/0169904 A1 * | 11/2002 | Kamihara et al. .......... 710/100 |

FOREIGN PATENT DOCUMENTS

| JP | 07-013898 | 1/1995 |
| JP | 11-345091 | 12/1999 |

* cited by examiner

*Primary Examiner*—Pierre-Michel Bataille
(74) *Attorney, Agent, or Firm*—Hayes Soloway P.C.

(57) ABSTRACT

An upper-level host has a control unit and a host controller for controlling the operation of a device. The host controller includes a buffer memory that reads data from the device into the buffer memory. The control unit reads data from the buffer memory and handles interruptions from the device. Moreover, the host controller reads data for every unit amount from the device with a part of the data of predetermined capacity left in the device, and reads data corresponding to a part of the data of predetermined capacity from the device into the buffer memory if the buffer memory is empty as the data in the buffer memory is transferred to the control unit.

11 Claims, 13 Drawing Sheets

CONTROL METHOD FOR DATA TRANSFER CONTROL UNIT

BACKGROUND OF THE INVENTION

1. Field of the Invention

The present invention relates to a control method for controlling a data transfer control unit, and more particularly to a control method for controlling the data transfer so that an upper-level host reads the data from a device such as a hard disk and accepts an interrupt signal from the device.

2. Description of the Prior Art

In recent years, the information electronic apparatuses represented by a mobile phone have widely spread in the world. It is well known that most of the information electronic apparatuses can operate using digital data.

Also, it is well known that such an information electronic apparatus includes a device such as a hard disk. When data is read from the device, or hard disk, an interface for making data transfer is based on standards that can cope with the higher speed due to an increased amount of transfer data. On the host part, for controlling the interface, the CPU carries out the control of the data transfer process. However, due to a request for a higher data transfer rate, a throughput (amount of job (work) processible per unit of time by the computer) in the data transfer is decreased. This becomes serious under the influence of a transfer control process carried out by the host.

The conventional data transfer control unit was disclosed in Japanese Patent Laid-Open No. 07-013898 or Japanese Patent Laid-Open No. 11-345091, for example. Referring to FIGS. 1 to 6, the conventional data transfer control unit will be described below. FIGS. 1 to 3 show a data transfer control unit in the conventional example, and FIGS. 4 to 6 show another data transfer control unit in the conventional example. And FIG. 1 is a block diagram showing the configuration of the data transfer control unit in the conventional example, FIG. 2 is a flowchart showing the operation of the data transfer control unit in the conventional example, and FIG. 3 is a timing chart showing the signal operation for the data transfer control unit in the conventional example. Also, FIG. 4 is a block diagram showing the configuration of another data transfer control unit in the conventional example, FIG. 5 is a flowchart showing the operation of another data transfer control unit in the conventional example, and FIG. 6 is a timing chart showing the signal operation for another data transfer control unit in the conventional example.

As shown in FIG. 1, LSI 1 is an upper-level host, i.e., a personal computer that comprises a CPU 10 as the control unit, and an ATA (AT Attachment) host controller 3 for controlling the operation of an ATA (AT Attachment)/ATAPI (AT Attachment Packet Interface) device 2 such as a hard disk or a CD-ROM drive. And, a process for reading the data from a storage medium within the ATA/ATAPI device 2 via the ATA host controller 3, or a data transfer process, is executed upon a command from the CPU 10.

In FIG. 2, steps A1 to A6 and A8 involve a control process of the CPU 10 for the ATA host controller 3 located inside the LSI 1. Also, steps B1, B2 and B7 involve a control process of the ATA host controller 3. Herein, data transfer, as used in this invention, means transferring data, especially when the upper-level host 1 reads the data from the ATA/ATAPI device 2.

Step A1 is a process for the CPU 10 to set the parameters required for the data transfer, including a start sector number, a sector size, a data size and a mode in the data transfer, on the ATA/ATAPI device 2 for performing the data transfer process.

Step A2 is a process for the CPU 10 to set the parameters required for the data transfer, including a data size and a mode in the data transfer to the ATA/ATAPI device 2 for performing the data transfer process on the ATA host controller 3.

Step A3 is a process for the CPU 10 to write a command for starting the actual transfer process by the parameters set at step A1 via the ATA host controller 3 into the ATA/ATAPI device 2.

Step A4 is a process for confirming the ATA/ATAPI device 2 of processing object as to whether or not the ATA/ATAPI device 2 has normally accepted the start of transfer process for the step A3.

Step A5 is a process for setting the ATA host controller 3 to a data transfer mode (read mode) to enable the ATA host controller 3 to start reading the data.

And step A6 is a process for detecting an interrupt signal from the ATA/ATAPI device 2, while the CPU 10 is reading the data from the ATA/ATAPI device 2 via the ATA host controller 3.

Then, the ATA/ATAPI device 2 issues an interrupt signal, after transferring the total data of a predetermined reading capacity to the ATA host controller 3.

Step A8 is a process for detecting whether or not the transferred data resides in a buffer memory 6 laid in the ATA host controller 3, namely, reading the value of a register indicating a state of the buffer memory 6. Then, at step A9, it is determined whether or not the state of the buffer memory 6 is empty, as a result of processing at step A8. If the state of the buffer memory 6 is empty, an interrupt process is enabled (not shown). Then, a transfer end process is performed.

The ATA host controller 3 switches to the data transfer mode at step B1 by accepting an instruction of step A5 from the CPU 10. That is, the ATA host controller 3 is switched to the data transfer mode.

At step B2, the ATA host controller 3 performs the data transfer process for reading the data from the ATA/ATAPI device 2 in accordance with the ATA protocol. Then, at step B7, a determination is made whether or not step B2 is repeated up to the data size set at step A2. In this manner, the LSI1, as the host, reads the data from the ATA/ATAPI device 2.

However, the prior art had the following disadvantages. That is, the data transfer rate is decreased owing to a polling process for the state of the ATA host controller 3 from the CPU 10 at steps A8 and A9, until it is recognized that the state of the buffer memory 6 in the ATA host controller 3 is empty at step A9.

That is, since a data signal 17 on a CPU bus 9 is attended with a cycle D8 in the polling process, as shown in a timing chart of FIG. 3, the cycle D8 and the data transfer cycle take place on the CPU bus 9 at the same time, resulting in the problem that the data transfer rate is decreased.

Also, in the prior art, the CPU 10 may not start the polling process for the state of the buffer memory 6 immediately, but may wait for a fixed time after the ATA/ATAPI device 2 issues the interrupt signal to begin the polling process.

In this case, however, due to a difference in the size of the buffer 6 for the ATA host controller 3 or the transfer rate of the CPU bus 9, it is required to individually set the timing from the recognition of an interruption to the start of the polling process for the buffer state. When the ATA host controller 3 is diverted to some other system, there is the disadvantage that the portability (transplantation) of a control program is lost because the processing method is different depending on the system.

In order to solve the above-mentioned problems, a means for laying a mask circuit 13 for masking an interrupt signal 12 input into the ATA/ATAPI device 2 till the end of transfer in the ATA host controller 16 is employed in the conventional example, as shown in FIG. 4. By using an EMPTY signal 14 (see FIG. 4) that is output from the buffer memory 6 indicating that the buffer is empty, the interrupt signal 12 output from the ATA/ATAPI device 2 is controlled. That is, based on the interrupt signal 12 from the ATA bus in FIG. 6, an interrupt signal 20 is output to the CPU bus 9 when an FIFO EMPTY signal 19 of ATA host controller internal signal is "H". Accordingly, step B1 for masking the interrupt signal and step B11 for removing the mask of the interrupt signal 12 after step B4 are added in FIG. 5. Hence, it is possible to suppress the polling process at steps A8 and A9 for the ATA host controller 16 from the CPU 10 in FIG. 1 and avoid a decrease in the data transfer rate.

However, with this data transfer method, there is the disadvantage that an interrupt signal can not be recognized until the buffer memory 6 becomes empty. If an interruption due to a data transfer error occurs from the ATA/ATAPI device 2, while the interrupt signal from the ATA/ATAPI device 2 is being masked depending on the state of the buffer memory 6 within the ATA host controller 16, an error process by the CPU 10 is delayed leading to an inconvenience that the system performance is degraded. If the data transfer via the CPU bus 9 is not made for some reason, the interrupt signal is not recognized at all, resulting in a problem that the system is frozen.

SUMMARY OF THE INVENTION

An object of the present invention is to provide a control method for a data transfer control unit in which the data transfer rate is suppressed from decreasing, and the operation is stable.

Thus, this invention provides a data transfer control method for controlling the data transfer by a control unit for controlling the operation of an upper-level host itself so that the control unit reads data of predetermined capacity from one device into a buffer memory of a host controller equipped in the upper-level host for controlling the operation of the device, and accepts an interruption issued from the device after the device transfers the data of predetermined capacity to the host controller, the control method comprising a data reading restricted step of the host controller reading the data from the device into the buffer memory for a unit amount with a part of the data of predetermined capacity left in the device, a data transfer step of the control unit reading the data of said unit amount temporarily held in the buffer memory, a buffer memory capacity detecting step of the host controller detecting whether or not the buffer memory is empty in parallel with the data transfer step, and a residual data reading step of the host controller reading the data corresponding to the part of data of the predetermined capacity from the device into the buffer memory when the capacity of the buffer memory is empty at the buffer memory capacity detecting step.

At this time, the capacity of a part of the data left in the device at the data reading step is preferably the minimum unit for reading.

Also, this invention provides a data transfer control method for controlling the data transfer by a control unit for controlling the operation of an upper-level host itself so that the control unit reads data of predetermined capacity from one device into a buffer memory of a host controller equipped in the upper-level host for controlling the operation of the device, and the host controller writes a CRC value into the device, the CRC value being the error detection data in transferring the read data, and the control unit accepts an interruption issued from the device having received the CRC value, the control method comprising a total data reading step of the host controller reading the data of predetermined capacity from the device into the buffer memory, a data transfer step of the control unit reading a unit amount of the data of predetermined capacity temporarily held in the buffer memory, a buffer memory capacity detecting step of the host controller detecting whether or not the buffer memory is empty in parallel with the data transfer step, and a CRC value writing step of the host controller writing a CRC value into the device when the capacity of the buffer memory is empty at the buffer memory capacity detecting step.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

The present invention is a control method of a control unit for making a data transfer to a storage device, such as a hard disk and a CD-ROM unit conforming to the ATA/ATAPI standards. More particularly, the invention is a reading control method for reading the data from the storage device immediately before the end of transfer to enable the data transfer to be made without causing the transfer rate to decrease, as will be described later.

First Embodiment

Figure 1:
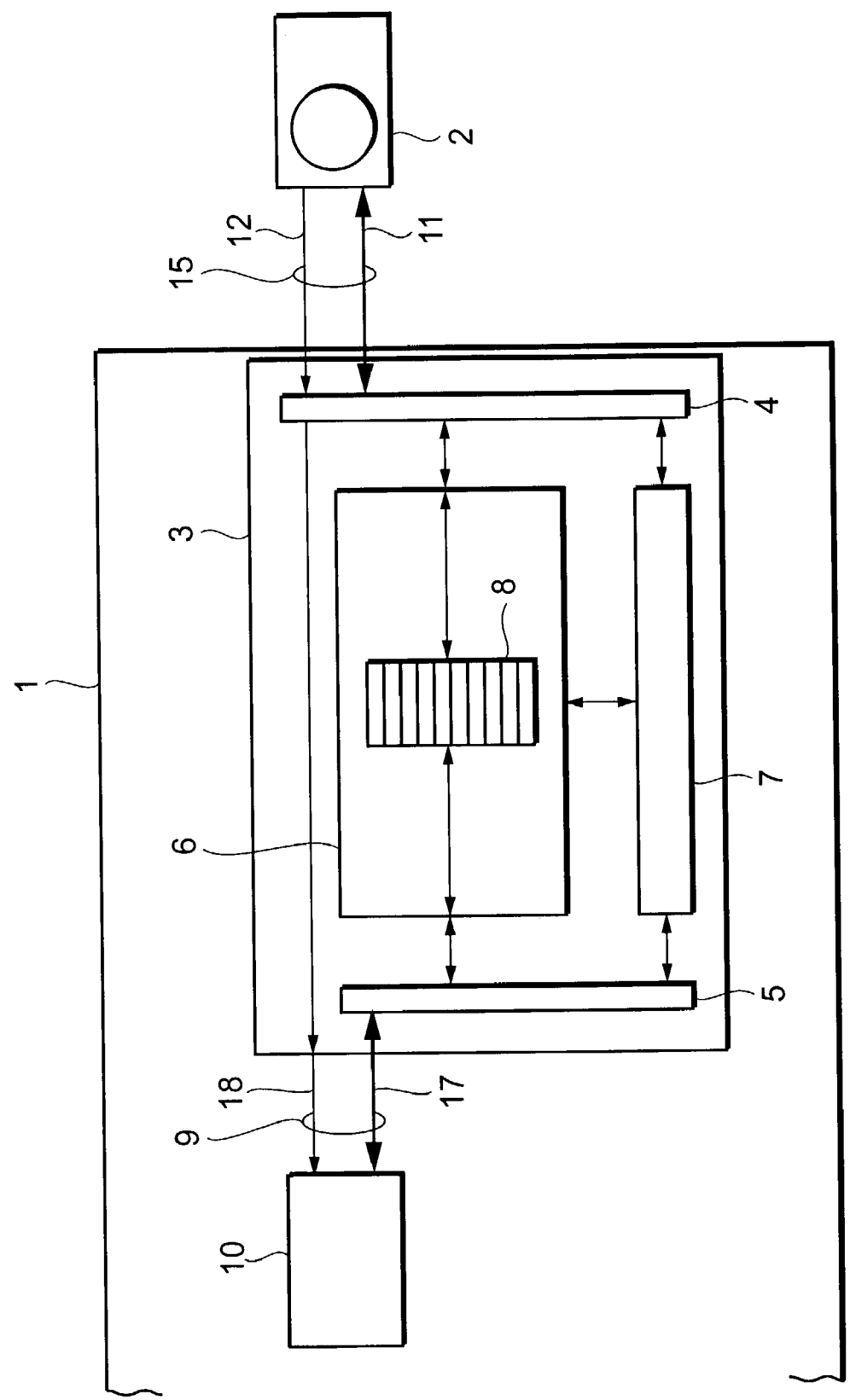
FIG. 1 is a block diagram showing the configuration of a data transfer control unit in a conventional example.
Figure 2:
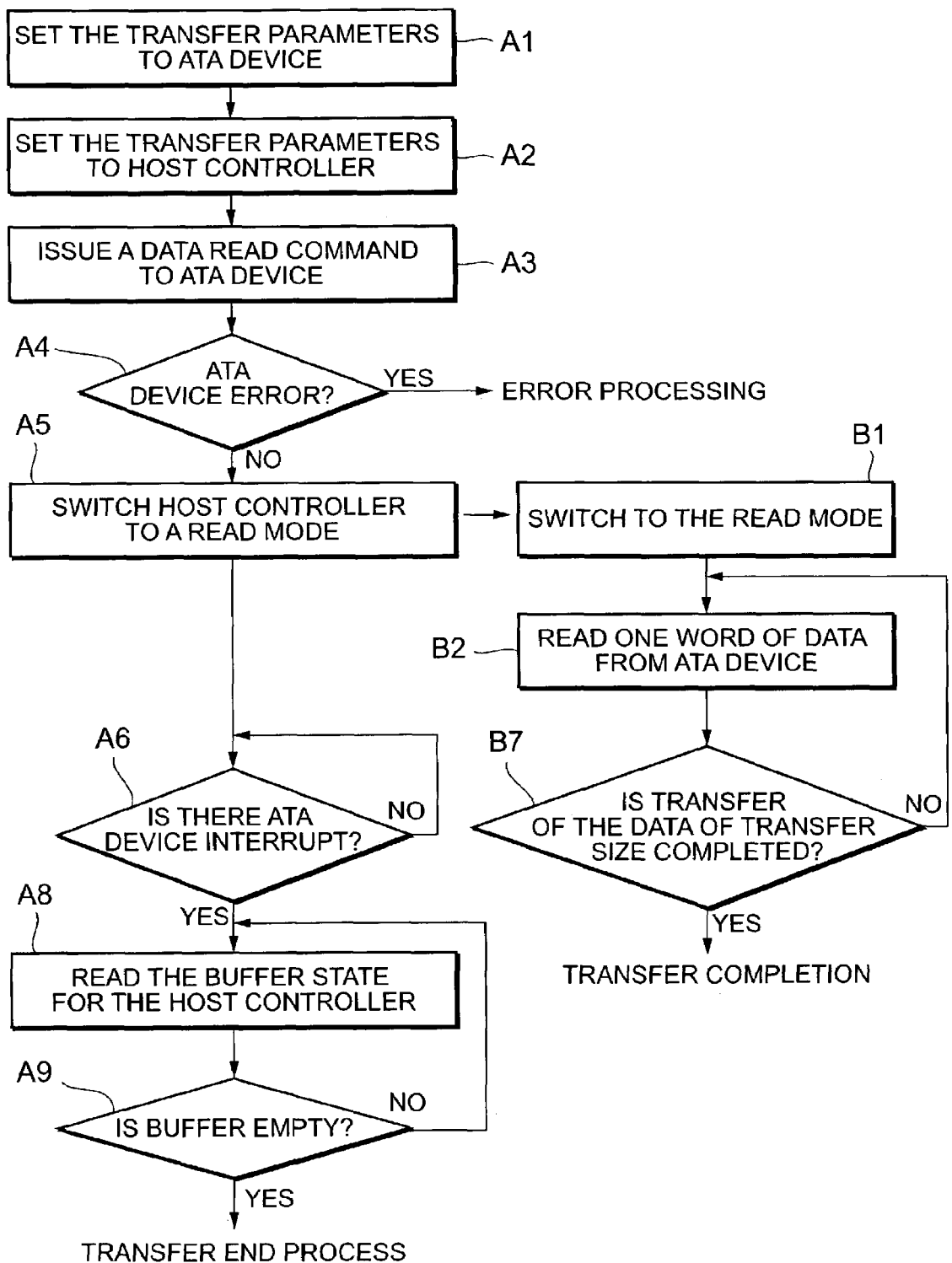
FIG. 2 is a flowchart showing the operation of the data transfer control unit in the conventional example.
Figure 3:
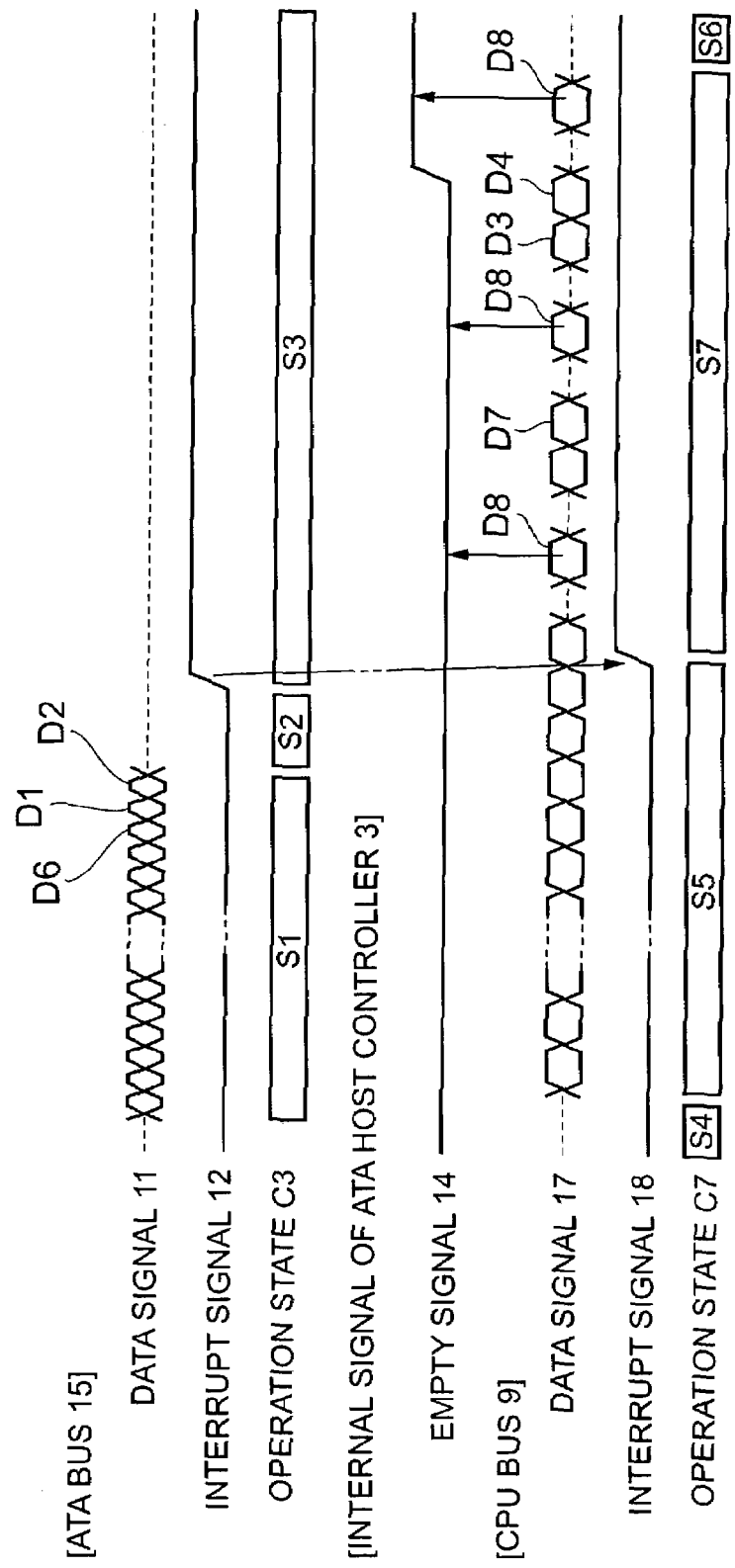
FIG. 3 is a timing chart showing the signal operation of the data transfer control unit in the conventional example.
Figure 4:
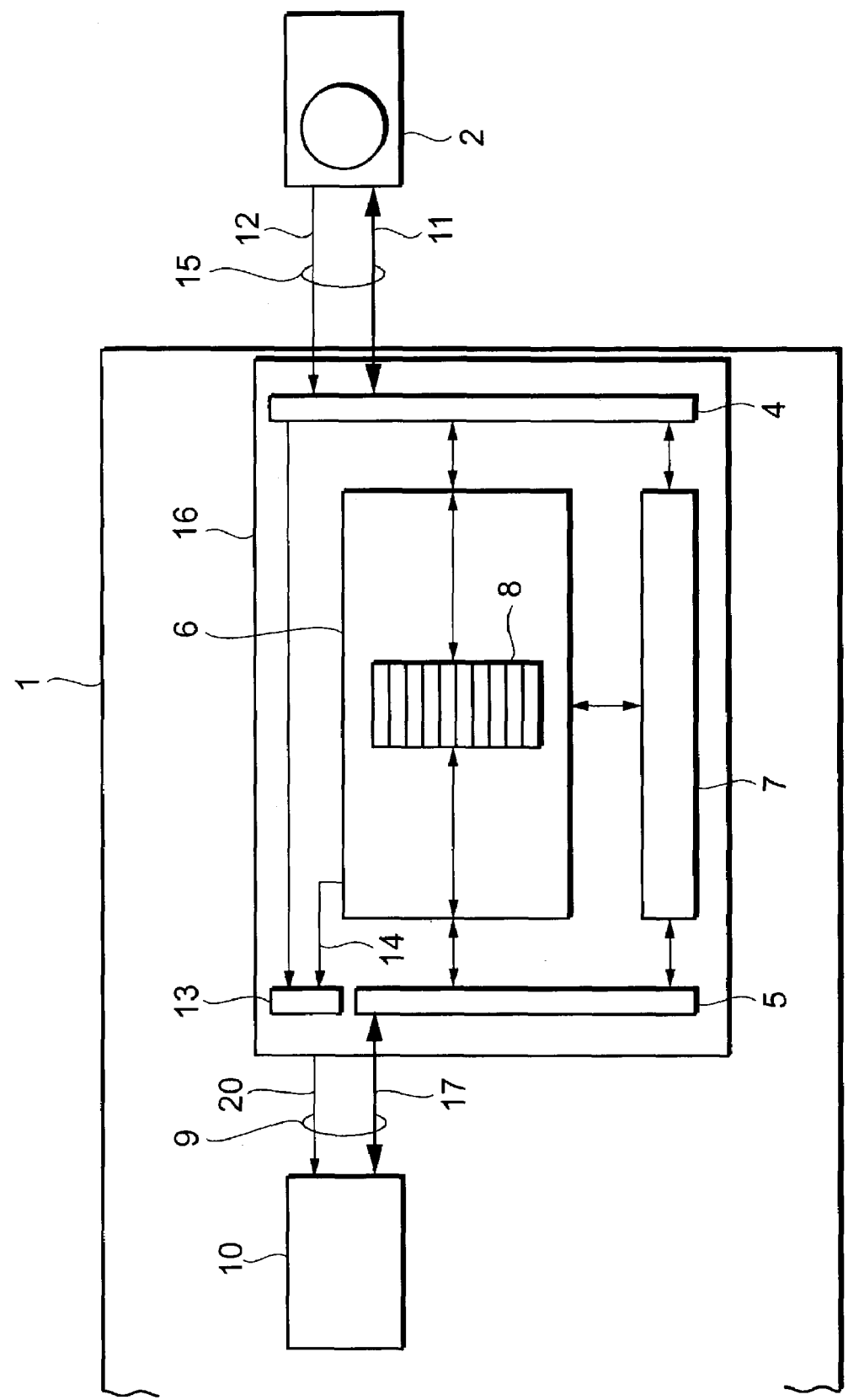
FIG. 4 is a block diagram showing the configuration of a data transfer control unit in another conventional example.
Figure 5:
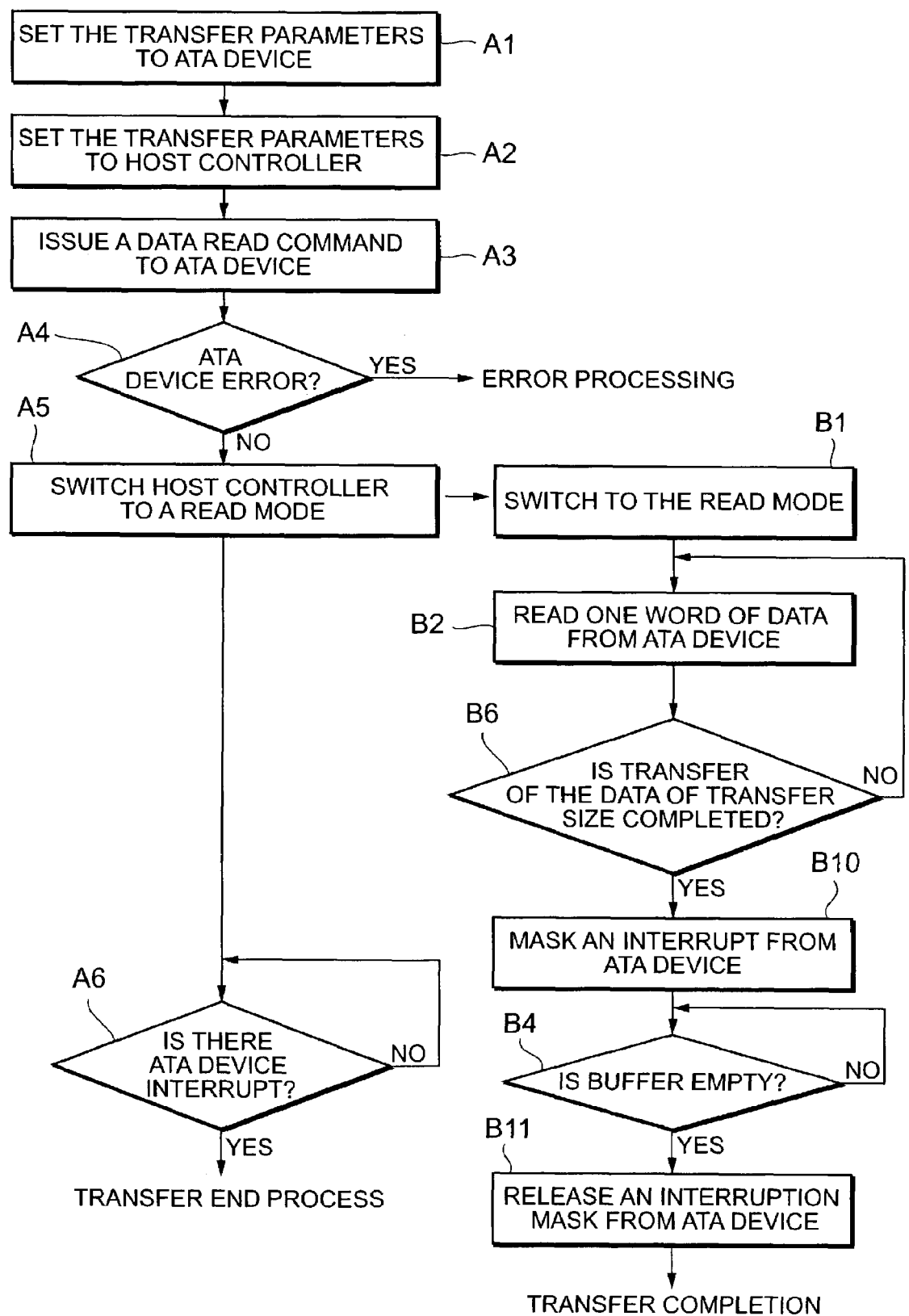
FIG. 5 is a flowchart showing the operation of the data transfer control unit in another conventional example.
Figure 6:
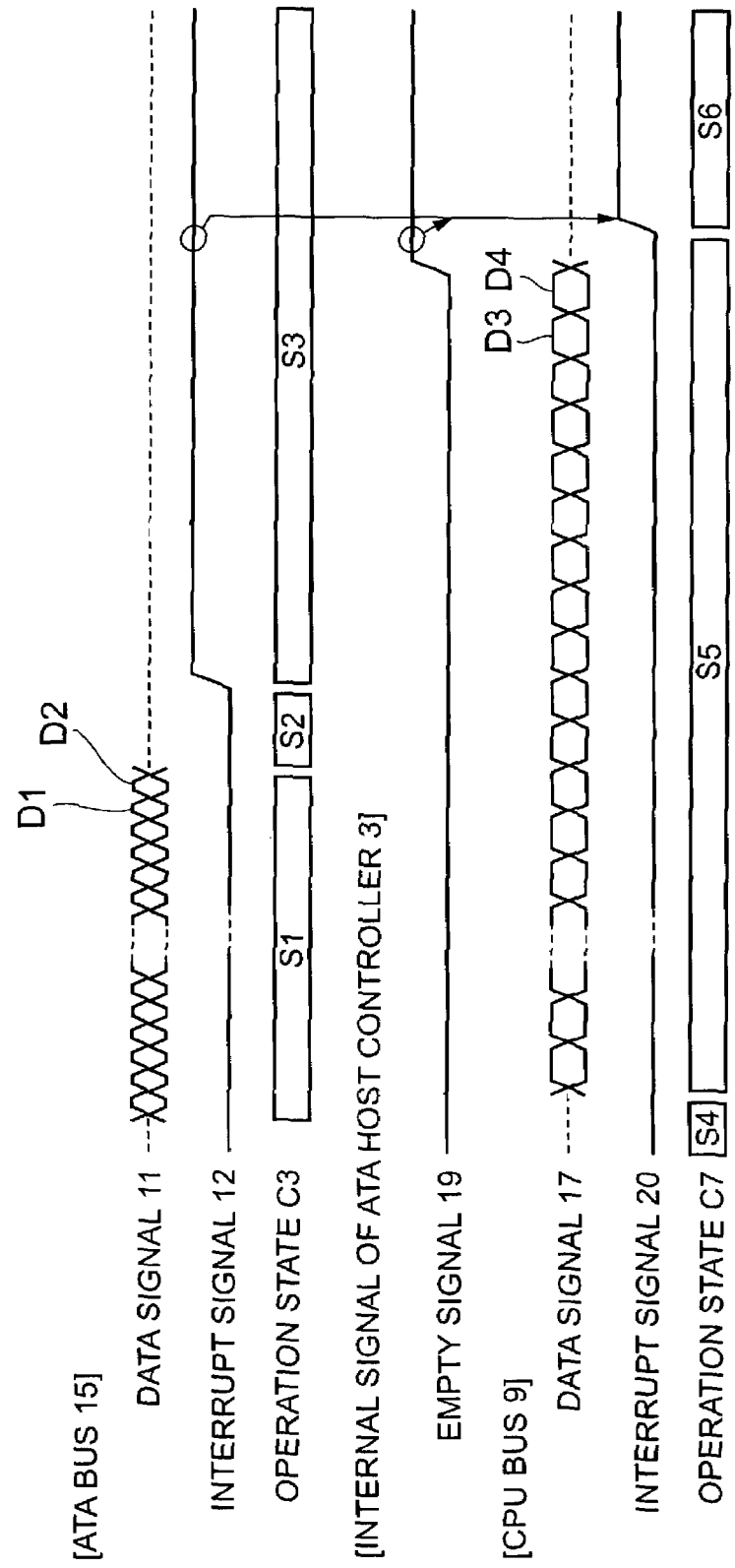
FIG. 6 is a timing chart showing the signal operation of the data transfer control unit in the another conventional example.
Figure 7:
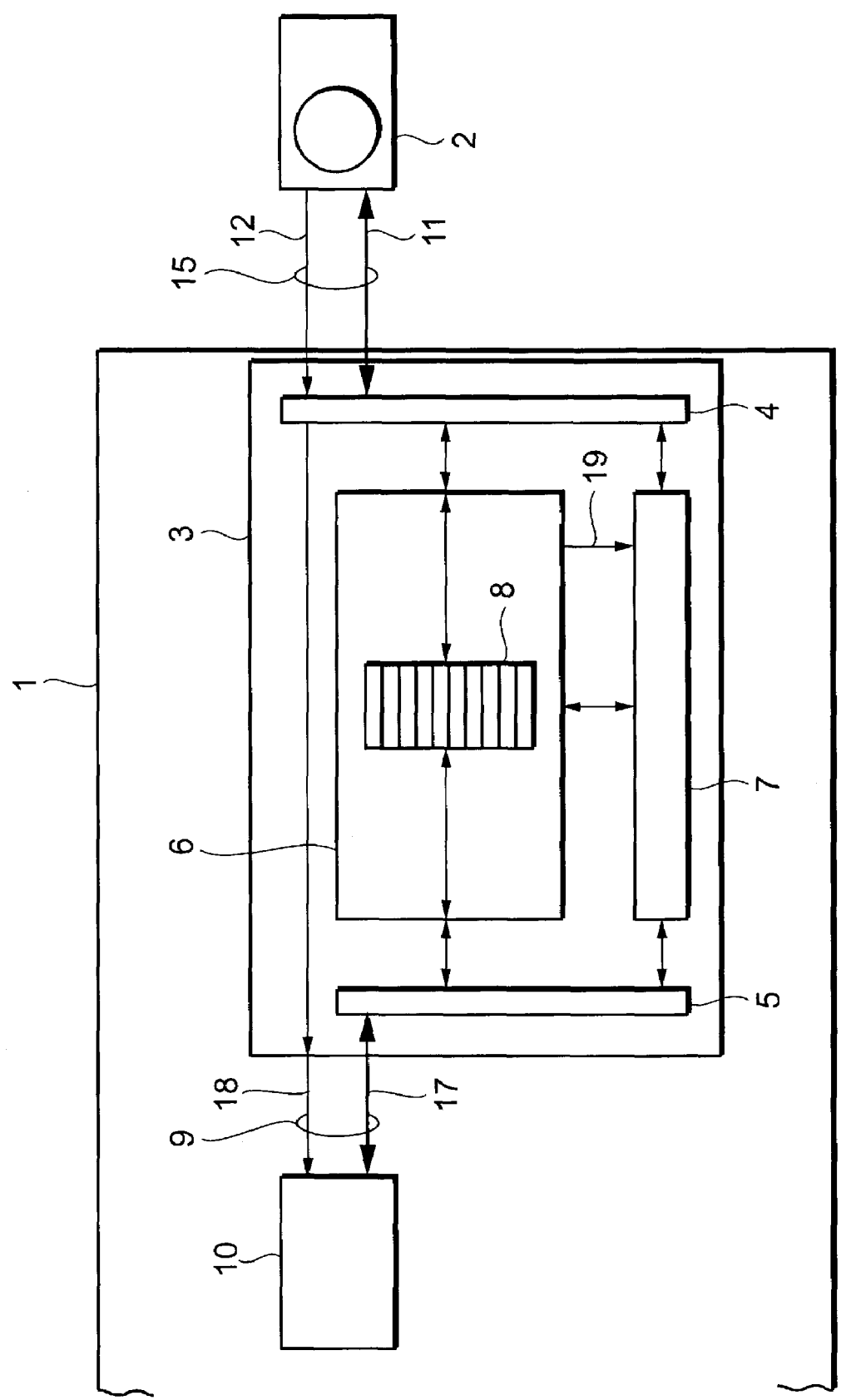
FIG. 7 is a block diagram showing the configuration of a data transfer control unit according to a first embodiment of the according to the invention.
Figure 8:
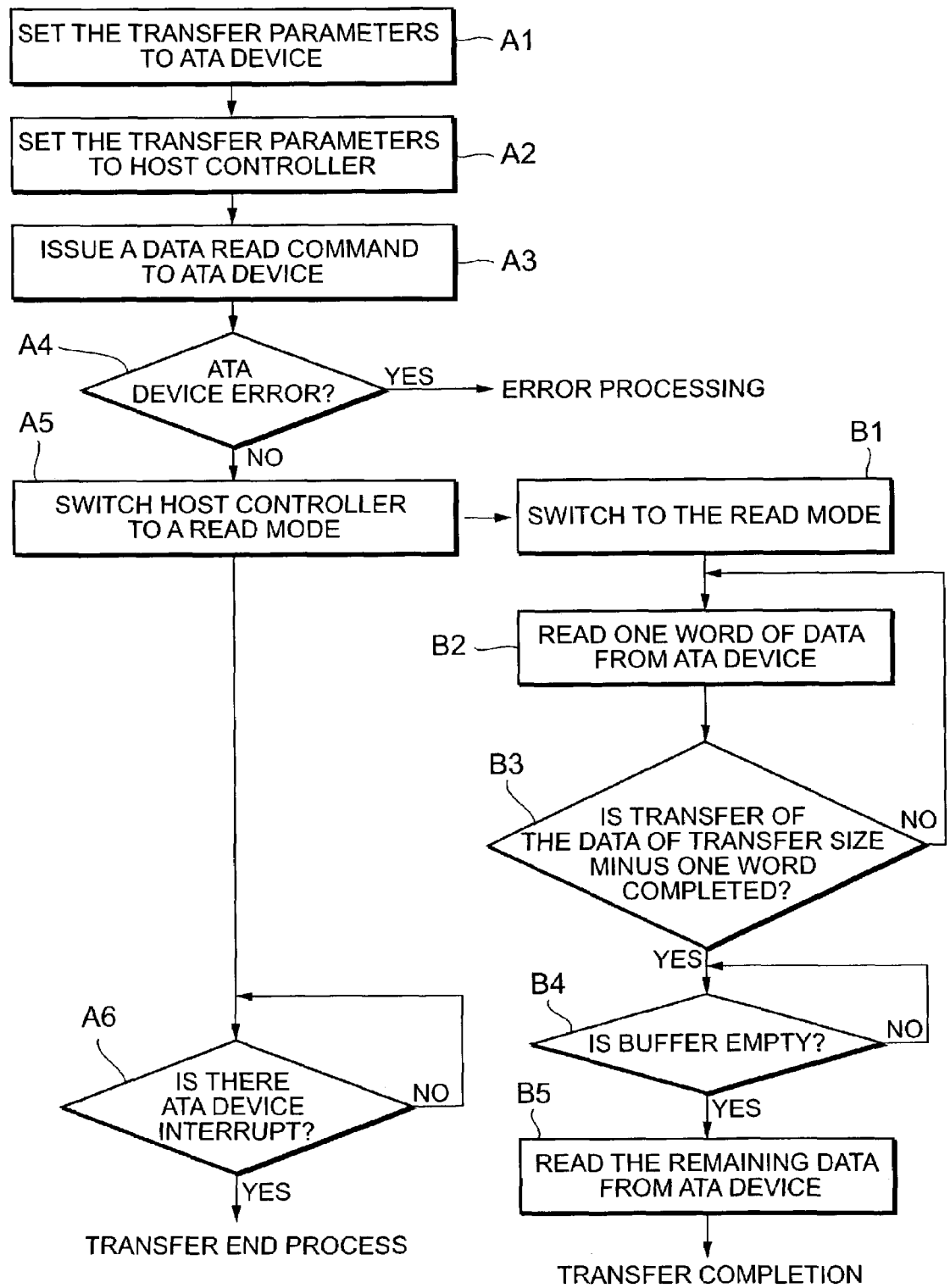
FIG. 8 is a flowchart showing the operation of the data transfer control unit according to the first embodiment of the invention.
Figure 9:
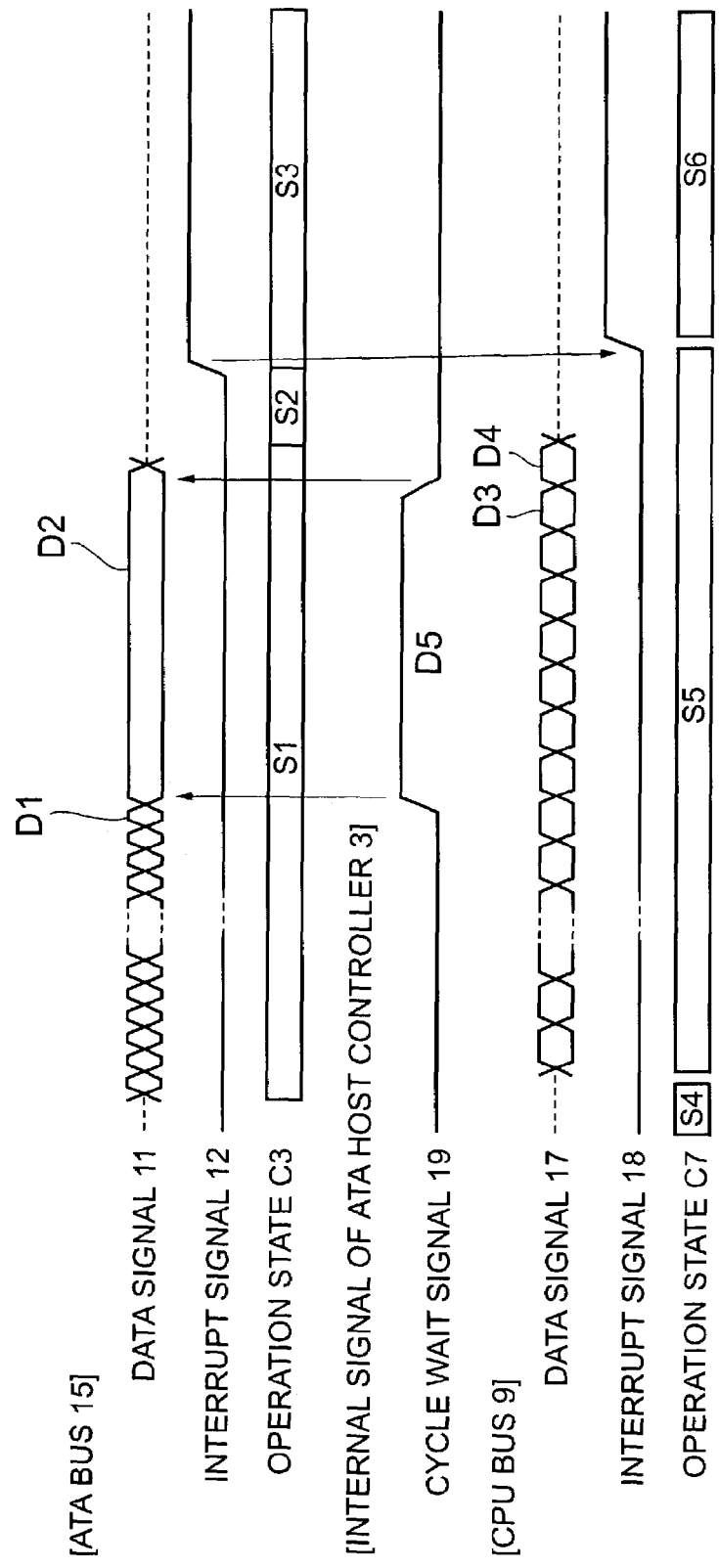
FIG. 9 is a timing chart showing the signal operation of the data transfer control unit according to the first embodiment of the invention.

Referring to FIGS. 7 to 9, a data transfer control unit according to a first embodiment of the invention will be described below. FIG. 7 is a block diagram showing the configuration of the data transfer control unit according to the first embodiment of the invention. FIG. 8 is a flowchart showing the operation of the data transfer control unit according to the first embodiment of the invention. FIG. 9 is a timing chart showing the signal operation of the data transfer control unit according to the first embodiment of the invention.

To begin with, the first embodiment will be outlined below. Referring to the flowchart of FIG. 8 showing the operation of a data reading circuit, an ATA host controller 3 suspends data transfer control over the ATA/ATAPI device 2 at a timing when the residual data is read at one more time in terms of the data size to be read from the ATA/ATAPI device 2.

And, the previously read data is transferred from a buffer memory 6 to a CPU 10. Then, if the buffer memory 6 is empty, the ATA host controller 3 resumes data transfer control to read the data from the ATA/ATAPI device 2 one more time.

Thereby, the polling process for the state of the ATA host controller 3 is suppressed at any time, until it is recognized that the state of the buffer memory 6 in the ATA host controller 3 is empty, thereby avoiding a decrease in the data transfer rate. Moreover, the CPU can recognize an interruption that occurs due to an error during the data transfer without delay.

Configuration

As shown in FIG. 7, a data transfer control unit of this invention is equipped in an upper-level host such as an LSI 1 having a function of controlling the ATA/ATAPI device 2.

More specifically, the data transfer control unit of this invention comprises CPU 10 which is a control unit for controlling the operation of the upper-level host 1 itself, and the ATA host controller 3 that is a host controller for controlling the operation of a certain device 2 provided for the upper-level host 1.

The ATA/ATAPI device 2 is a hard disk or a CD-ROM conforming to the ATA/ATAPI standards. The ATA/ATAPI device 2 is connected to the ATA host controller 3 via an ATA bus 15.

The ATA bus 15 includes a control signal conforming to the ATA standards, a data signal 11 for passing the data and an interrupt signal 12. Inside the LSI 1, the ATA host controller 3 and the CPU 10 are connected via a CPU bus 9. The CPU bus 9 includes a control signal from the CPU 10 to the ATA host controller 3, a data signal 17 for passing the data, and an interrupt signal 18.

The configuration of the ATA host controller 3 is as follows. That is, the ATA host controller 3 comprises an ATA interface portion 4 for passing the data with the ATA bus 15, a CPU interface portion 5 for passing the data with the CPU bus 9, a buffer memory 6 for temporarily storing the transfer data to the ATA bus 15 and the CPU bus 9, and a control portion 7 for controlling the operation of the ATA bus 15 and the CPU bus 9.

Also, the control portion 7 of the buffer memory 6 has a cycle wait signal 19 connected to temporarily suspend the data transfer from the buffer memory 6 via the ATA bus 15. The buffer memory 6 for temporarily storing the transfer data via the ATA bus 15 and the CPU bus 9 is constituted of an FIFO 8 that processes data in the input order.

Herein, the fundamental functions of the data transfer control unit will be described below. First of all, the ATA host controller 3 has a function of reading the data from the ATA/ATAPI device 2 into the buffer memory 6 in accordance with an instruction from the CPU 10. In this manner, the data from the ATA/ATAPI device 2 is firstly read into the buffer memory 6. Also, the CPU 10 has a function of reading the data held in the buffer memory 6, and a function of handling an interruption to be output by the ATA/ATAPI device 2 after transferring the data to the ATA host controller 3.

Thereby, the CPU 10 can read the data from the ATA/ATAPI device 2 and handle the interruption from the ATA/ATAPI device 2. However, there is a problem of delay with the polling process as above described.

In this embodiment, the ATA host controller 3 further has a data reading restricted function of reading the data for every unit amount with a part of the data of predetermined reading capacity preset from the ATA/ATAPI device 2 left in the buffer memory 6 provided within the host controller 3, and a residual data reading function of reading the data from the ATA/ATAPI device 2 by detecting that the buffer memory 6 is empty when the data in the buffer memory 6 is transferred to the CPU 10 and reading a residual part of the data of predetermined reading capacity into the buffer memory 6.

With these functions, the data transfer control unit in this embodiment operates as follows. In this connection, the functions provided for the CPU 10 and the ATA host controller 3 are implemented by incorporating their function programs into an operation processing portion (the CPU 10 itself or the control portion 7 of the buffer memory 6). And those programs are stored beforehand in a storage device (not shown) within the LSI 1.

Referring now to FIGS. 8 and 9, the operation of the first embodiment of the invention will be described below in detail. FIG. 9 is a timing chart showing the signal operation via the ATA bus and the CPU bus through the processing contents of FIG. 8.

First of all, in FIG. 8, step A1 is a process for setting the parameters required for the data transfer, including a start sector number, a sector size, a data size and a mode in the data transfer, on the ATA/ATAPI device 2 to which the CPU 10 performs the data transfer as shown in FIG. 7.

At this time, the ATA/ATAPI device 2 writes a sector number indicating the start address of sector to be actually transferred and a sector size indicating the number of transfer sectors from this sector number into a register defined by the ATA standards for the ATA/ATAPI device 2 in accordance with a transfer protocol of the ATA/ATAPI device 2.

Step A2 is a process for setting the parameters required for the data transfer, including a data size and a mode in the data transfer to the ATA/ATAPI device 2 for performing the data transfer process on the ATA host controller 3. Here, the CPU 10 calculates the data size from the sector size set at the step A1 and the data size per sector, and sets it on the ATA host controller 3.

Step A3 is a process in which the CPU 10 writes a command with the transfer method in accordance with the ATA standards to instruct the start of the actual transfer process to the ATA/ATAPI device 2 into a register of the ATA/ATAPI device 2. At this time, a status register of the ATA/ATAPI device 2 is read to confirm the ATA/ATAPI device 2 as to whether or not the start of the transfer process is normally accepted at step A3. Herein, if an error occurs, the data transfer process is immediately suspended to make an error process (step A4). If there is no error, a data transfer mode (read mode) is set to the ATA host controller 3 at step A5, so that the ATA host controller transits the mode for transferring data to the ATA/ATAPI device 2.

The above steps are performed during an interval S4 in an operation state C7 of the CPU bus, as shown in FIG. 9. Thereafter, the operation transits to a step of detecting an interrupt signal from the ATA/ATAPI device 2 through the step A5. And this step is performed during an interval S5 in the operation state C7 of the CPU bus, as shown in FIG. 9.

Subsequently, step B1 is performed in the ATA host controller 3. That is, the data transfer is made to the ATA/ATAPI device 2 under the control of the ATA host controller 3, while the CPU 10 performs the step A5.

Subsequently, at step B2, the data transfer is made to the ATA/ATAPI device 2 in accordance with the ATA protocol. Herein, since the ATA/ATAPI device 2 and the ATA host controller 3 have switched to the data transfer mode at steps A3 and A5, they make the hand shaking for data transfer to transfer the data by the data size set at the steps A2 and A3.

These steps are performed during the interval S5 in the operation state C7 of the CPU bus 9 and during an interval S1 in the operation state C3 of the ATA bus, as shown in FIG. 9. At this time, the step B2 is repeated until the data size to be transferred is 1 remaining word at step B3 (data reading restricted step).

That is, all the data of the data size set at the steps A2 and A3 is not transferred at a time, but read into the buffer memory 6 with part of data left in the ATA/ATAPI device 2. The term "word" as used herein means the minimum unit of data that can be read at a time. For example, 1 word is equal to 32 bits.

When the data size of data to be transferred is 1 remaining word, namely, at a timing on a cycle D2 in the data signal 11 of the ATA bus 15 as shown in FIG. 9, the cycle wait signal 19, which is an internal signal of the ATA host controller 3, is turned "H" (rising).

In an interval where the cycle wait signal 19 is "H" (see D5 in FIG. 9), the data signal 11 of the ATA bus 15 is used as a waiting signal to extend the cycle D2. Thereby, reading the data from the ATA/ATAPI device 2 at step B2 is once suspended with one word left.

At this time, the data transferred from the ATA/ATAPI device 2 to the ATA host controller 3 at step B2 is stored in the buffer memory 6 laid for the ATA host controller 3. The CPU 10 reads this stored data via the CPU bus 9 until the buffer memory 6 is empty (data transfer process).

When the control portion 7 for the buffer memory 6 recognizes that the buffer memory 6 is empty (buffer memory capacity detecting process), i.e., a timing when a cycle D3 for a data signal 17 on the CPU bus 9 ends as shown in FIG. 9, the cycle wait signal 19 is turned "L" (falling signal).

Thereby, the remaining one word of data is transferred from the ATA/ATAPI bus 2 to the ATA host controller 3. Namely, the cycle D2 for the data signal 11 is released from waiting, so that the cycle D2 ends (remaining data reading process), as shown in FIG. 9.

Thereafter, the CPU 10 reads one word of data stored in the buffer memory 6, so that the cycle D4 for the data signal 17 on the CPU bus 9 is completed, as shown in FIG. 9.

If the ATA/ATAPI device 2 fully transfers all the data to the ATA host controller 3, an interrupt signal 12 of the ATA bus 15 is turned "H" (rising signal) to inform the ATA host controller 3 of an interrupt, through a recovery interval S2 where the interrupt signal in the processing content C3 of the ATA bus is output, as shown in FIG. 9. That is, the operation is at an interrupt signal output time in an interval S3 for the processing content C3 on the ATA bus 15.

Then, the ATA host controller 3 receives the interrupt signal 12 from the ATA/ATAPI device 2, and turns an interrupt signal 18 on the CPU bus 9 "H" to inform the CPU 10 that there is an interrupt, as shown in FIG. 9.

The CPU 10 receives this signal, exits out of the step A6, and reads the status register of the ATA/ATAPI device 2 to determine whether or not the data transfer has normally ended. And the operation transits to a state S6 in the operation state C7 on the CPU bus 9, as shown in FIG. 9. If there is no error, the data transfer is ended.

In this manner, the data transfer from the ATA/ATAPI device 2 is once waited at a timing of the remaining one time of transfer immediately before the data transfer is ended in the ATA host controller 3. The step for performing the final data transfer if the buffer memory 6 becomes empty is added, whereby no interrupt process from the ATA/ATAPI device 2 is output until the final data is transferred to the buffer memory 6. Accordingly, it is possible to suppress the polling process for the state of the ATA host controller 3 from the CPU 10.

The final data transferred by the ATA/ATAPI device 2 is one word. Therefore, the data is promptly transferred to the CPU 10 after it is transferred to the buffer memory 6. Even if an interruption is output, the state of the buffer memory 6 for the ATA host controller 3 immediately becomes empty. Hence, the polling process and the data transfer are not performed on the CPU bus 9 at the same time, whereby it is possible to suppress a decrease in the data transfer rate effectively.

The above effect may be varied, depending on the buffer size or the CPU performance. Generally, suppose the CPU in which the size of the buffer memory 6 for the ATA host controller 3 is 512 Kbyte, and the polling takes place at every 10 cycles during the data transfer. In this case, if the transfer data size is less than or equal to the buffer size, the transfer rate is increased by about 10% over the prior art, irrespective of the data size. When the transfer data size is greater than or equal to the buffer size, no polling is made for the transfer of final 512 Kbyte, where the data size is 1 Mbyte, and the transfer rate is increased by about 5% over the prior art.

In the prior art, a signal mask circuit was required for masking an interrupt signal from the ATA/ATAPI device 2 not to be passed to the CPU 10, depending on the state of the buffer memory 6 in the ATA host controller 3.

In this invention, this circuit is not needed, and the CPU 10 can promptly recognize an interruption that occurs due to an error during data transfer. Accordingly, it is possible to decrease a delay in the error interrupt handling.

Moreover, in this invention, the step for once waiting the data transfer when one word remains for transfer immediately before the data transfer is ended in the ATA host controller 3, and performing the final data transfer if the buffer memory 6 becomes empty, is added.

Thereby, it is unnecessary to always make the polling process for the state of the ATA host controller 3 from the CPU 10 until it is recognized that the state of the buffer memory 6 in the ATA host controller 3 is empty. And, a ROM fetch process for reading the program on the CPU bus 9 or the control process for other interfaces and the polling process are not performed on the CPU bus at the same time. Hence, it is possible to enhance the total system performance, such as the stability of the system.

This transfer control method is controlled on the basis of transferring the data from the ATA/ATAPI device 2, irrespective of the size of the buffer 6 for the ATA host controller 3, and thereby does not depend on the transfer timing.

Accordingly, it is unnecessary to switch the timing of the process, depending on the size of the buffer 6 for the ATA host controller 3. That is, this control unit and method can be employed for all the ATA/ATAPI devices 2, with the greater universality.

Second Embodiment

Figure 10:
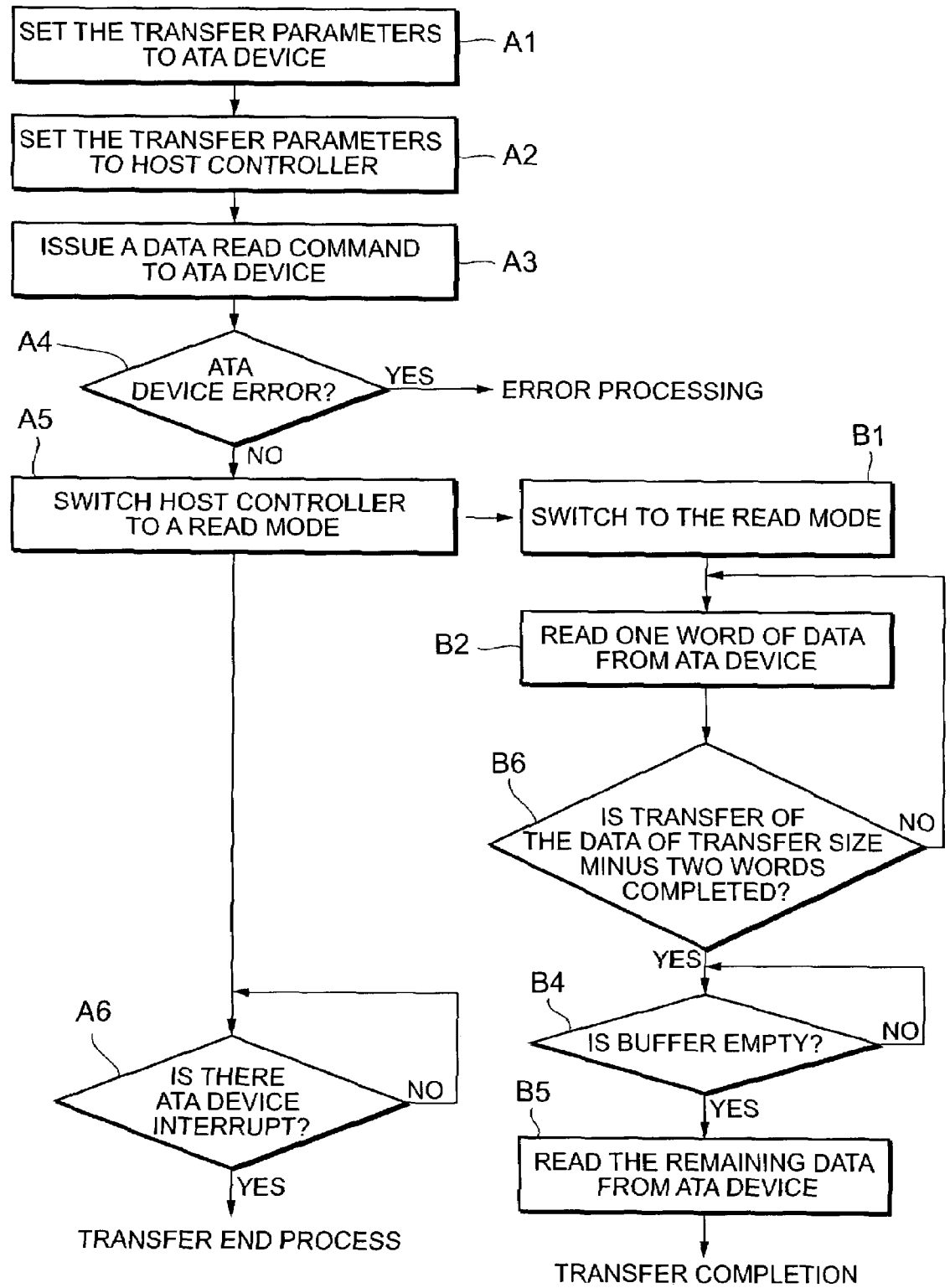
FIG. 10 is a flowchart showing the operation of a data transfer control unit according to a second embodiment of the invention.
Figure 11:
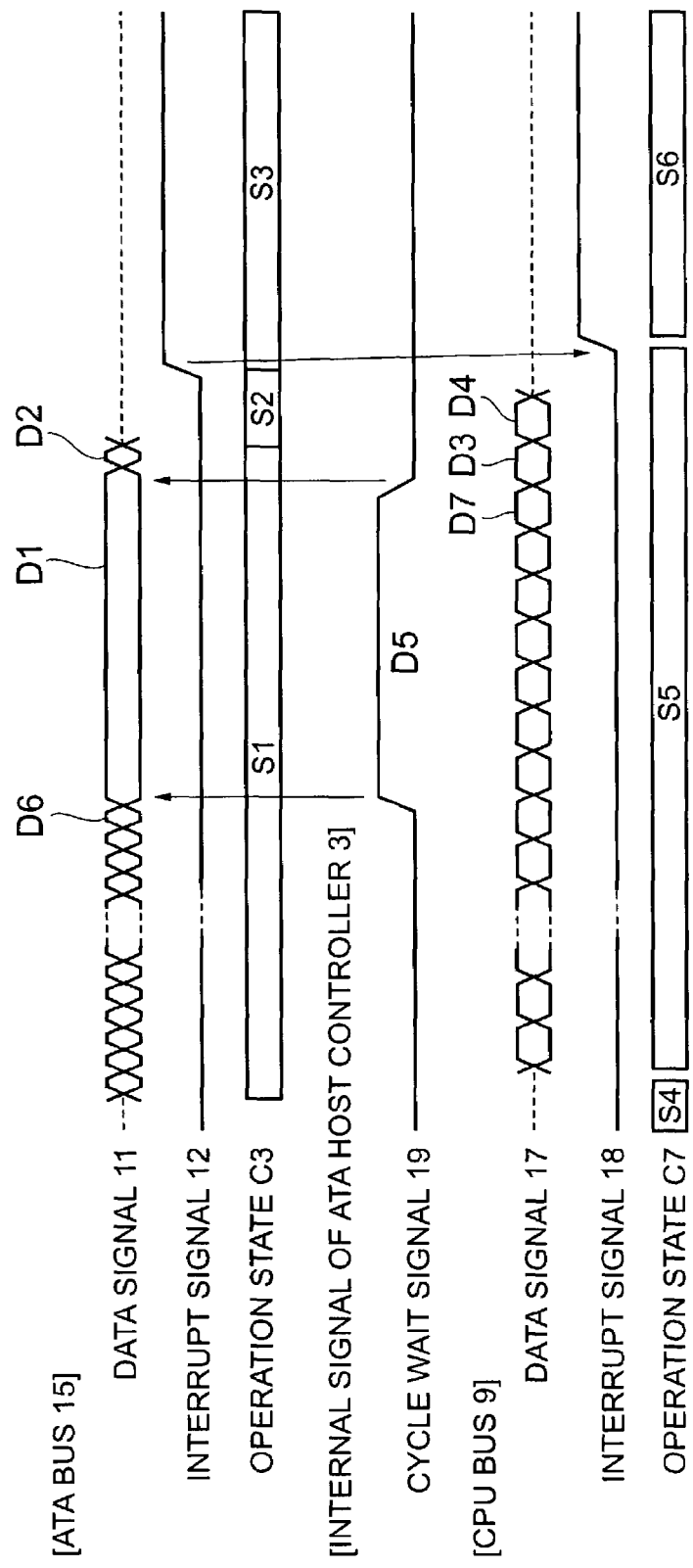
FIG. 11 is a timing chart showing the signal operation of the data transfer control unit according to the second embodiment of the invention.

Referring now to FIGS. 10 and 11, a second embodiment of this invention will be described below. FIG. 10 is a flowchart showing the operation of the second embodiment of the invention, and FIG. 11 is a timing chart showing the signal operation in the second embodiment.

The configuration of the second embodiment of the invention is fundamentally the same as that of the first embodiment. Though in the configuration of the first embodiment of the invention, the remaining data size at step B3, or the data amount left unread from the ATA/ATAPI device 2 is one word, the remaining data size at step B6 is two words in the configuration of the second embodiment of the invention as shown in FIG. 10.

In FIG. 11, the cycle wait signal 19 is turned "H" for the data signal 11 on the ATA bus 15 at a timing when the transfer data is remaining two words, namely, when the data cycle on the ATA bus 15 is cycle D1.

Referring to FIG. 10, the operation will be described below in detail. In FIG. 10, the steps A1 to A6 involve a control process of the CPU 10 for the ATA host controller 3 controlling the operation of the ATA/ATAPI device 2, which is constituted inside the LSI 1. Also, the steps B1, B2, B4, B5 and B6 involve a control process of the ATA host controller 3.

In the second embodiment of the invention, step A1 involves setting the parameters required for the data transfer, including a start sector number, a sector size, a data size and a mode in the data transfer on the ATA/ATAPI device 2 to which the CPU 10 performs the data transfer (shown in FIG. 7).

At this time, the ATA/ATAPI device 2 writes a sector number indicating the start address of a sector to be actually transferred and a sector size indicating the number of transfer sectors from this sector number into a register defined by the ATA standards of the ATA/ATAPI device 2 in accordance with a transfer protocol of the ATA/ATAPI device 2.

Step A2 involves setting the parameters required for the data transfer, including a data size and a mode in the data transfer to the ATA/ATAPI device 2 for performing the data transfer process on the ATA host controller 3 in the second embodiment of the invention. Here, the CPU 10 calculates the data size from the sector size set at the step A1 and the data size per sector, and sets it on the ATA host controller 3.

Step A3 involves the CPU 10 writing a command with the transfer method in accordance with the ATA standards to instruct the start of the actual transfer process to the ATA/ATAPI device 2 into a register of the ATA/ATAPI device 2. At this time, a status register of the ATA/ATAPI device 2 is read to confirm whether or not the start of the transfer process is normally accepted for the step A3.

If an error occurs, the data transfer process is immediately suspended to make an error process (step A4). If there is no error, a data transfer mode (read mode) is set in the ATA host controller 3 at step A5, so that the ATA host controller is changed to a mode of transferring the data to the ATA/ATAPI device 2. At step A6, an interrupt signal from the ATA/ATAPI device 2 is detected.

The ATA host controller 3 performs a process of switching to the data transfer mode (step B1) by accepting step A5. Then, step B2 is performed to transfer the data to the ATA/ATAPI device 2 in accordance with the ATA protocol.

At step B3, a determination is made whether or not step B2 is repeated until the transfer data is remaining two words in terms of the data size set at step A2 in the second embodiment of the invention. That is, in the second embodiment of the invention, the data transfer is first performed for the data size scheduled to be transferred less two words.

Then, at step B4, the operation waits until the data transferred at step B2 is read from the buffer memory 6 laid in the ATA host controller 3 by the CPU 10 in the second embodiment of the invention. If the data sized two words less than the predetermined transfer size is transferred to the CPU 10, and the buffer memory 6 becomes empty, the data transfer for remaining two words is made to the ATA/ATAPI device 2 in accordance with the ATA protocol, like step B2.

If these steps end, an interruption from the ATA/ATAPI device 2 may be executed. In this case, because the buffer memory 6 becomes immediately empty, the interrupt process can be rapidly executed (step A6).

In this manner, in the second embodiment of the invention, a step for once waiting the data transfer from the ATA/ATAPI device 2 at a timing of the remaining two words of transfer immediately before the data transfer is ended in the ATA host controller 3, and performing the final data transfer if the buffer memory 6 becomes empty is added.

Thereby, no interruption from the ATA/ATAPI device 2 is output until the final data is transferred to the buffer memory 6, so that the polling process for the state of the ATA host controller 3 by the CPU 10 is suppressed.

Because the final data transferred by the ATA/ATAPI device 2 is two words, the data is promptly transferred to the CPU 10 after the data is transferred to the buffer memory 6. Therefore, even if an interrupt process is output, the state of the buffer memory 6 for the ATA host controller 3 is immediately turned an empty state. Hence, the polling process and the data transfer are not performed on the CPU bus 9 at the same time, and it is possible to suppress a decrease in the data transfer rate effectively.

Hence, if the output timing of an interrupt signal from the ATA/ATAPI device 2 is delayed in the system configuration, i.e., the interval S2 in the operation state C3 on the ATA bus as shown in FIG. 11 is longer, the data transfer size at step B2 may be smaller than or equal to "predetermined transfer data size—one word" at step B3, thereby attaining the same effect.

In other words, when the data is read from the ATA/ATAPI device 2 with the data reading restricted function of the ATA host controller 3, the data left in the ATA/ATAPI device 2 is not limited to one word, but there is no restriction on the capacity so long as it is a part of the predetermined transfer capacity, so that the CPU 10 can transfer the data from the buffer memory 6 quickly. However, the polling is suppressed more effectively as the capacity is smaller.

Third Embodiment

Figure 12:
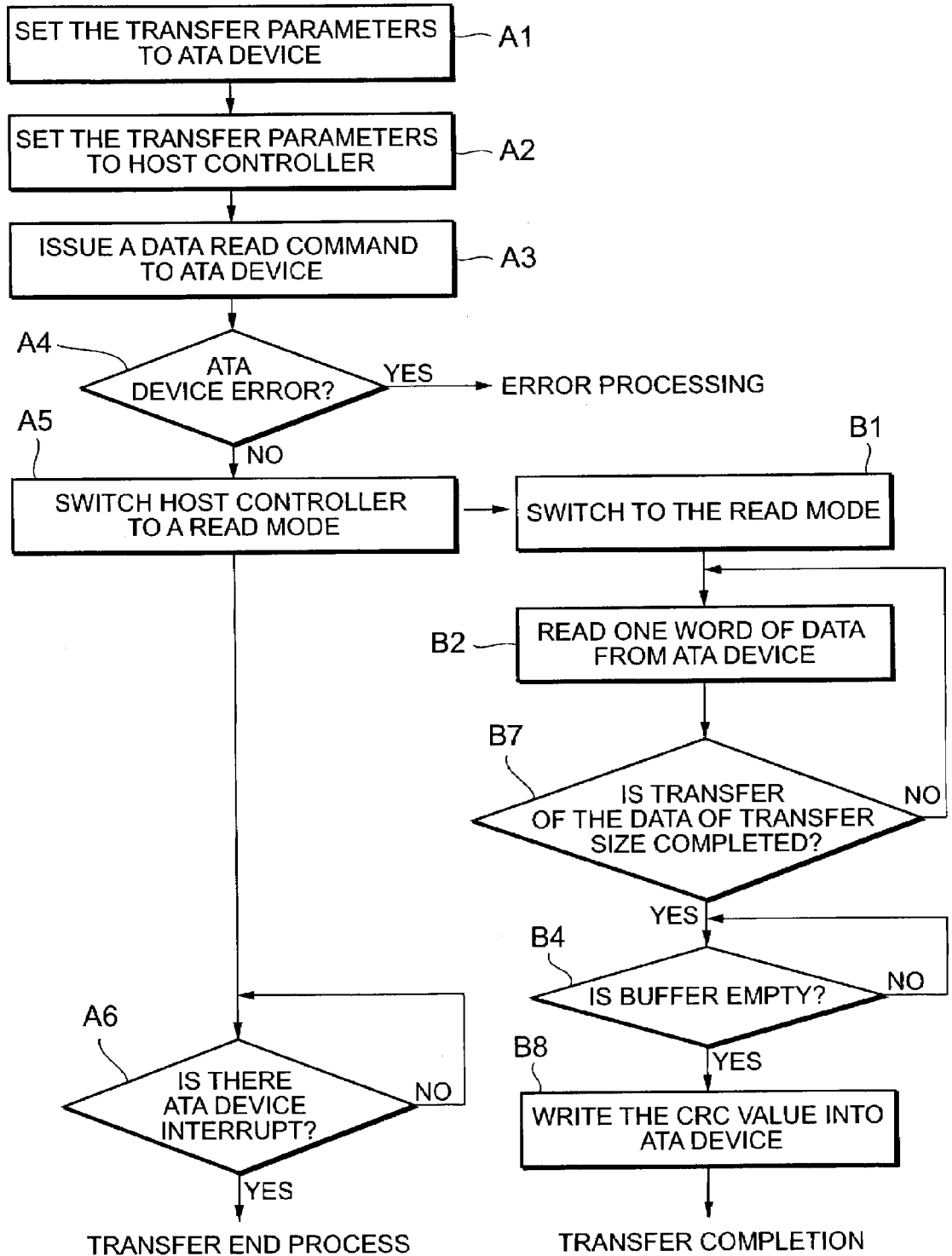
FIG. 12 is a flowchart showing the operation of a data transfer control unit according to a third embodiment of the invention.
Figure 13:
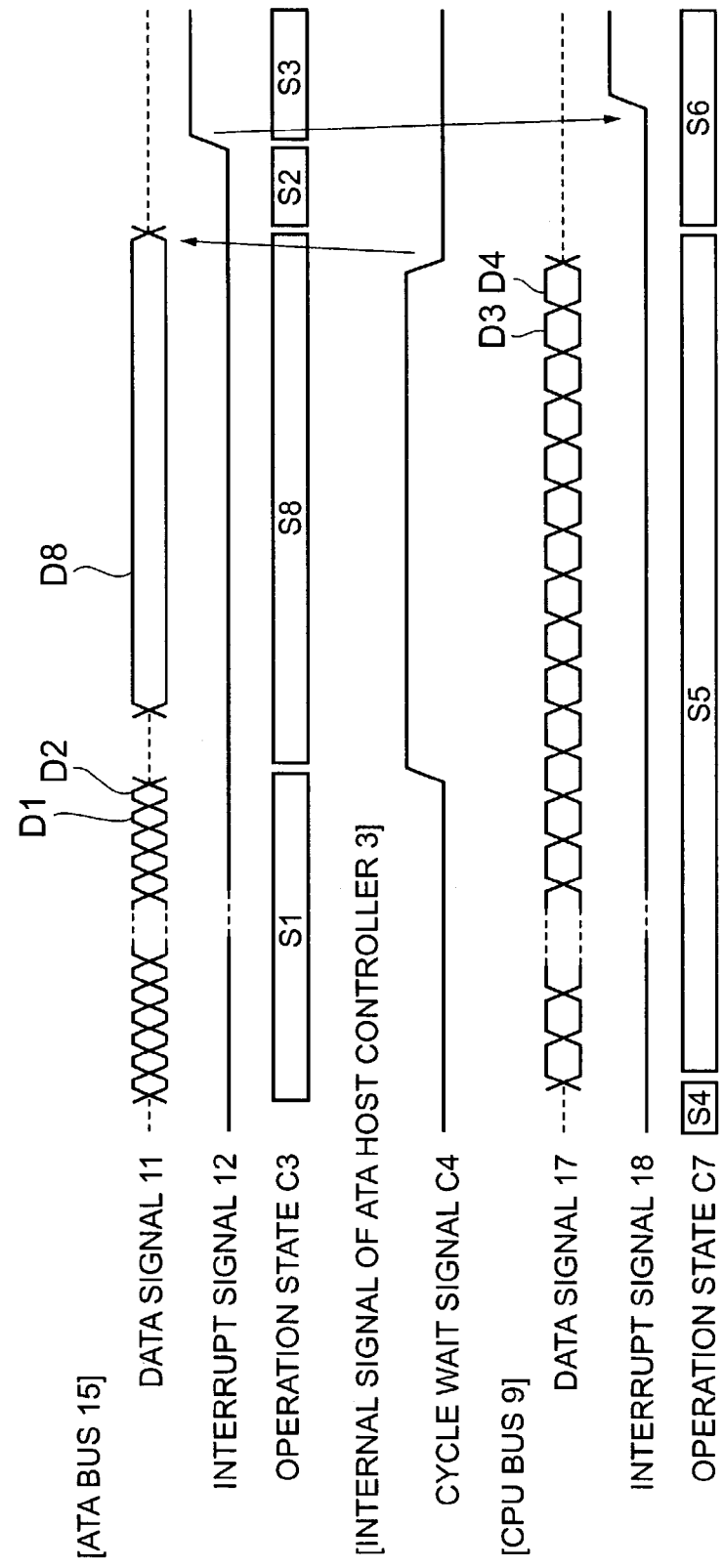
FIG. 13 is a timing chart showing the signal operation of the data transfer control unit according to the third embodiment of the invention.

Referring now to FIGS. 12 and 13, a third embodiment of this invention will be described below. FIG. 12 is a flowchart showing the operation of the third embodiment of the invention, and FIG. 13 is a timing chart showing the signal operation in the third embodiment.

This third embodiment is different from the first embodiment in that all the data is transferred at step B7 as shown in FIG. 12 although the transfer data size at step B3 is remaining one word in the first embodiment as shown in FIG. 8.

Moreover, at step B8, the CRC value of the data transferred is written into the ATA/ATAPI device 2, although the data transfer for remaining data is made at step B5 in the first embodiment.

Also, the third embodiment, as shown in FIG. 13, is different from the first embodiment as shown in FIG. 9, in that an ATA bus data cycle wait signal C4 is turned "H" when the transfer of all the data ends, i.e., a cycle D2 in the data signal 11 on the ATA bus ends. And, a CRC output cycle D8 from the host exists in the data signal 11 on the ATA bus 15, and a CRC receiving wait S8 from the host exists in the operation state C3 on the ATA bus 15, unlike the first embodiment of FIG. 9.

Therefore, the ATA host controller 3 in the third embodiment has a function of writing the CRC value of error detection data for the data read from the ATA/ATAPI device 2 into the ATA/ATAPI device 2.

This function is particularly a CRC value writing function of writing the CRC value into the ATA/ATAPI device 2 by detecting that the buffer memory 6 is empty as the data in the buffer memory 6 is transferred to the CPU 10.

The data reading function is a function of reading all the data of predetermined reading capacity for every unit amount from the ATA/ATAPI device 2 into the buffer memory 6 provided in the ATA host controller 3.

That is, in the third embodiment of the invention, unlike the first and second embodiments of the invention, all the data is read into the buffer memory 6 without leaving the data in the ATA/ATAPI device 2.

The CPU 10 has a function of accepting an interruption output from the ATA/ATAPI device 2 having received the CRC value. That is, the ATA/ATAPI device 2 issues an interrupt request to the host 1 after receiving the CRC value.

Referring to FIG. 12, the operation will be described below in detail. In FIG. 12, the steps A1 to A6 involve a control process of the CPU 10 for the ATA host controller 3 controlling the operation of the ATA/ATAPI device 2, which is constituted inside the LSI 1. Also, the steps B1, B2, B4, B7 and B8 involve a control process of the ATA host controller 3.

In the third embodiment of the invention, step A1 involves setting the parameters required for the data transfer, including a start sector number, a sector size, a data size and a mode in the data transfer, on the ATA/ATAPI device 2 to which the CPU 10 performs the data transfer as shown in FIG. 7.

At this time, the ATA/ATAPI device 2 writes a sector number indicating the start address of sector to be actually transferred and a sector size indicating the number of transfer sectors from this sector number into a register defined by the ATA standards of the ATA/ATAPI device 2 in accordance with a transfer protocol of the ATA/ATAPI device 2 in the third embodiment of the invention.

Step A2 involves setting the parameters required for the data transfer, including a data size and a mode in the data transfer to the ATA/ATAPI device 2 for performing the data transfer process on the ATA host controller 3. Here, the CPU 10 calculates the data size from the sector size set at the step A1 and the data size per sector, and sets it on the ATA host controller 3.

Step A3 involves the CPU 10 writing a command with the transfer method in accordance with the ATA standards to instruct the start of the actual transfer process to the ATA/ATAPI device 2 into a register of the ATA/ATAPI device 2. At this time, a status register of the ATA/ATAPI device 2 is read to confirm the ATA/ATAPI device 2 as to whether or not the start of the transfer process is normally accepted for the step A3 in the third embodiment of the invention.

If an error occurs, the data transfer process is immediately suspended to make an error process (step A4). If there is no error, a data transfer mode (read mode) is set in the ATA host controller 3 at step A5, so that the ATA host controller transits to a mode of transferring the data to the ATA/ATAPI device 2. At step A6, an interrupt signal from the ATA/ATAPI device 2 is detected.

The ATA host controller 3 performs a process of switching to the data transfer mode (step B1) by accepting the step A5. Then, step B2 is performed to transfer the data to the ATA/ATAPI device 2 in accordance with the ATA protocol. Then, at step B7, a determination is made whether or not the step B2 is repeated until the data size set at step A2 is reached in the third embodiment of the invention. That is, all the data of predetermined reading capacity is read from the ATA/ATAPI device 2 into the buffer memory 6.

Thereafter, at step B4, the operation waits until the data transferred at step B2 is read from the buffer memory 6 laid in the ATA host controller 3 via the CPU bus 9 to the CPU 10. If all the data are transferred, the CRC value for the transferred data that is calculated in the ATA host controller 3 is written into the ATA/ATAPI device 2 at step B8.

Herein, in accordance with an Ultra DMA transfer protocol of the ATA standards, there is a need for writing the CRC value of transferred data from the host controller into the ATA/ATAPI device after the end of data transfer at step B8. When the transfer is normally made, an interrupt signal is output after the ATA/ATAPI device 2 accepts the writing of the CRC value. This third embodiment of the invention utilizes this feature of this process.

That is, all the preset data is read from the ATA/ATAPI device 2 into the buffer memory 6 laid in the ATA host controller 3, and transferred via the CPU bus 9 to the CPU 10. Then, the operation waits until it is recognized that all the data are transferred, and the CRC value is output at step B8.

Thereby, an ATA bus data cycle wait signal C4 that is an ATA host controller internal signal is turned "H" after a cycle D2 in the data signal 11 on the ATA bus ends as shown in FIG. 13. Whereby a CRC output cycle D8 from the ATA host controller 3 waits in an interval where the ATA bus data cycle wait signal C4 is "H". And, the CPU 10 reads the data stored in the buffer memory 6 laid in the ATA host controller 3 via the CPU bus 9.

The ATA bus data cycle wait signal C4 is turned "L" when it is recognized that the buffer is empty, namely, after a cycle D4 in the data cycle C5 on the CPU bus is ended as shown in FIG. 13. Thereby a wait of the CRC output cycle D8 from the ATA host controller 3 is released, so that the CRC value is output to the ATA/ATAPI device 2, and an interruption from the ATA/ATAPI device 2 is output to the host 1.

In this case, the data transfer from the buffer memory 6 to the CPU 10 has already ended, so that the buffer memory 6 is empty, and the CPU 10 can promptly execute the interruption to attain the same effect.

In this invention, first of all, the data is read from the ATA/ATAPI device into the buffer memory of the host controller, with a part of the data of predetermined capacity left in the device, while the data is transferred from the buffer memory to the control unit.

At this time, the host controller reads the remaining data of predetermined capacity from the ATA/ATAPI device into the buffer memory, after the buffer memory is empty, and that data is promptly transferred to the control unit. Hence, even if an interruption is output immediately after all the data of predetermined transfer capacity is output, this interruption can be immediately processed because the buffer memory becomes empty at once.

As a result, it is possible to suppress the simultaneous occurrence of the polling process and the data transfer, whereby it is possible to suppress a decrease in the data transfer rate with more excellent effect.

Also, in this invention, the control unit can promptly recognize an interrupt that occurs due to an error during the data transfer, whereby a circuit for masking the interrupt signal is not needed, unlike the conventional example, and a delay of the processing caused by the error interrupt is reduced.

Moreover, the step of reading the program to be executed inside the upper-level host, or the control process for other interfaces and the polling process are not performed in the host at the same time, whereby it is possible to enhance the total system performance, such as the stability of the system.

Since the transfer control method is controlled on the basis of the number of transferring the data from the ATA/ATAPI device, irrespective of the buffer size of the host controller, it is unnecessary to switch the timing of process, depending on the size of the buffer memory. Hence, this control unit and method can be employed for all the ATA/ATAPI devices, with the greater universality.

In accordance with the Ultra DMA transfer protocol of the ATA standards, there is a need for the step of writing the CRC value of transferred data from the host controller into the ATA/ATAPI device after the end of data transfer.

However, in this case, all the data of predetermined transfer capacity are read from the ATA/ATAPI device into the buffer memory, and transferred to the control unit. Then, after the buffer memory is empty, the CRC value is written into the ATA/ATAPI device, which then issues an interrupt request after receiving this CRC value. At this time, since the buffer memory is empty, the interrupt request can be promptly processed, whereby it is possible to suppress a decrease in the data transfer rate.

What is claimed is:

1. A control method for controlling data transfer by a control unit for controlling the operation of an upper-level host itself so that said control unit reads data of predetermined capacity from a device into a buffer memory of a host controller equipped in said upper-level host, and accepts an interruption issued from said device after said device transfers the data of predetermined capacity to said host controller, said control method comprising:

a data reading restricted step of said host controller reading the data from said device into said buffer memory for a unit amount with a part of the data of predetermined capacity left in said device;

a data transfer step of said control unit reading the data of said unit amount temporarily held in said buffer memory;

a buffer memory capacity detecting step of said host controller detecting whether or not said buffer memory is empty in parallel with said data transfer step; and a residual data reading step of said host controller reading the data corresponding to the part of data of said predetermined capacity from said device into said buffer memory when said buffer memory is empty at said buffer memory capacity detecting step.

2. The control method according to claim 1, wherein the capacity of the part of the data left in said device at said data reading restricted step is a minimum unit amount of data that said host controller can read at a time from said device.

3. The control method according to claim 2, wherein the minimum unit of said data is 1 word of 32 bits.

4. The control method according to claim 2, wherein the part of the data left in said device is 2 words where 1 word is 32 bits.

5. The control method according to claim 1, wherein said device is a storage device.

6. The control method according to claim 5, wherein said storage device is a hard disk.

7. The control method according to claim 5, wherein said storage device is a CD-ROM.

8. A control method for controlling data transfer by a control unit for controlling the operation of an upper-level host itself so that said control unit reads data of predetermined capacity from a device into a buffer memory of a host controller equipped in said upper-level host, and said host controller writes a CRC value into said device, said CRC value being the error detection data in transferring the read data, and said control unit accepts an interruption issued from said device having received said CRC value, said control method comprising:

a total data reading step of said host controller reading the data of said predetermined capacity from said device into said buffer memory;

a data transfer step of said control unit reading a unit amount of the data of said predetermined capacity temporarily held in said buffer memory;

a buffer memory capacity detecting step of said host controller detecting whether or not said buffer memory is empty in parallel with said data transfer step; and a CRC value writing step of said host controller writing a CRC value into said device when said buffer memory is empty at said buffer memory capacity detecting step.

9. The control method according to claim 8, wherein said device is a storage device.

10. The control method according to claim 9, wherein said storage device is a hard disk.

11. The control method according to claim 9, wherein said storage device is a CD-ROM.

* * * * *